(12) United States Patent
Zhou et al.

(10) Patent No.: US 10,811,935 B2
(45) Date of Patent: Oct. 20, 2020

(54) SCREEN TURNING-OVER MECHANISM

(71) Applicant: THALES CETC AVIONICS CO., LTD., Chengdu, Sichuan (CN)

(72) Inventors: Kui Zhou, Sichuan (CN); Zhenhua Song, Sichuan (CN)

(73) Assignee: THALES CETC AVIONICS CO., LTD., Chengdu, Sichuan (CN)

(*) Notice: Subject to any disclaimer, the term of this patent is extended or adjusted under 35 U.S.C. 154(b) by 163 days.

(21) Appl. No.: 15/658,860

(22) Filed: Jul. 25, 2017

(65) Prior Publication Data
US 2018/0041096 A1 Feb. 8, 2018

(30) Foreign Application Priority Data

Aug. 8, 2016 (CN) .......................... 2016 1 0645267

(51) Int. Cl.
*H02K 7/14* (2006.01)
*H02K 7/116* (2006.01)
(Continued)

(52) U.S. Cl.
CPC ............ *H02K 7/14* (2013.01); *B60R 11/0235* (2013.01); *B64D 11/0015* (2013.01);
(Continued)

(58) Field of Classification Search
CPC ......... B60R 11/0235; B60R 2011/0082; B60R 2011/0092; B61D 49/00; B64D 11/0015;
(Continued)

(56) References Cited

U.S. PATENT DOCUMENTS 5,734,251 A * 3/1998 Tajima ................... H02P 21/09
318/804
6,256,078 B1 7/2001 Ogata
(Continued)

FOREIGN PATENT DOCUMENTS

CN 2620648 Y 6/2004
CN 101289078 A 10/2008
(Continued)

OTHER PUBLICATIONS

Translation of foreign document JP 2009166582 (Year: 2009).*
(Continued)

*Primary Examiner* — Alex W Mok
(74) *Attorney, Agent, or Firm* — Yue (Robert) Xu; Apex Attorneys at Law, LLP

(57) ABSTRACT

A screen turning-over mechanism includes a rotating shaft connected to a screen and a motor drivably connected to the rotating shaft. The motor is connected to an electromagnetic damping loop which forms a closed path with the motor only when the motor is in a de-energized state. The rotating shaft is also connected to an elastic mechanism. When the motor is energized, the motor drives the rotating shaft to rotate to extend the screen, and the rotating shaft drives the elastic mechanism to deform elastically to store energy; and when the motor is de-energized, the elastic mechanism releases the stored energy to drive the rotating shaft to rotate to retract the screen. The screen turning-over mechanism according to the present application has a simple and compact structure, occupies a small volume of space, and has a long service life.

7 Claims, 2 Drawing Sheets

(51) Int. Cl.
   *H02K 11/24* (2016.01)
   *H02K 7/10* (2006.01)
   *H02K 11/30* (2016.01)
   *H02P 3/12* (2006.01)
   *E06B 9/72* (2006.01)
   *F16M 11/18* (2006.01)
   *F16M 11/10* (2006.01)
   *B60R 11/02* (2006.01)
   *F16M 13/02* (2006.01)
   *B64D 11/00* (2006.01)
   *B60R 11/00* (2006.01)
   *B61D 49/00* (2006.01)

(52) U.S. Cl.
   CPC ............. *F16M 11/10* (2013.01); *F16M 11/18* (2013.01); *F16M 13/027* (2013.01); *H02K 7/1004* (2013.01); *H02K 7/116* (2013.01); *H02K 11/24* (2016.01); *H02K 11/30* (2016.01); *H02P 3/12* (2013.01); *B60R 2011/0082* (2013.01); *B60R 2011/0092* (2013.01); *B61D 49/00* (2013.01); *H02K 2207/00* (2013.01)

(58) Field of Classification Search
   CPC ...... F16M 11/10; F16M 11/18; F16M 13/027; H02K 11/24; H02K 11/30; H02K 2207/00; H02K 7/1004; H02K 7/116; H02K 7/14; H02P 3/12
   USPC .......................................................... 310/72
   See application file for complete search history.

(56) References Cited

U.S. PATENT DOCUMENTS

| | | | |
|---|---|---|---|
| 2006/0060439 A1* | 3/2006 | Shirokoshi | G06F 1/1601 188/382 |
| 2012/0002361 A1 | 1/2012 | Tanaka et al. | |
| 2012/0262868 A1 | 10/2012 | Kato | |
| 2012/0306426 A1* | 12/2012 | Ikeda | H02P 5/52 318/609 |
| 2013/0312920 A1* | 11/2013 | Mullet | E06B 9/40 160/310 |
| 2014/0077746 A1* | 3/2014 | Sekiguchi | H02P 23/14 318/561 |
| 2015/0319396 A1 | 11/2015 | Yan et al. | |

FOREIGN PATENT DOCUMENTS

| | | |
|---|---|---|
| CN | 201220633 Y | 4/2009 |
| CN | 201854237 U | 6/2011 |
| CN | 103016927 A | 4/2013 |
| DE | 202014102754 U1 | 6/2014 |
| JP | 2000159197 A | 6/2000 |
| JP | 2009166582 A | 7/2009 |
| JP | 2014205376 A | 10/2014 |

OTHER PUBLICATIONS

Extended European Search Report for corresponding Application No. 17275106.7 dated Dec. 22, 2017.
First Chinese Office Action regarding application No. 201610645267.5 dated Jan. 4, 2018. English translation provided by https://globaldossier.upsto.gov.

* cited by examiner

SCREEN TURNING-OVER MECHANISM

CROSS REFERENCE OF RELATED APPLICATION

The present application claims the priority to Chinese Patent Application No. 201610645267.5, titled "SCREEN TURNING-OVER MECHANISM", filed on Aug. 8, 2016, with the State Intellectual Property Office of the People's Republic of China, the content of which application is incorporated herein by reference in its entirety.

FIELD

The present application relates to the technical field of screen device retracting-extending systems, and particularly to a screen turning-over mechanism.

BACKGROUND

In airplanes or trains, generally a screen device is provided to play information such as movies and advertisements to passengers. In order to reduce the impact of the screen device on space, the screen device is generally equipped with a retracting-extending mechanism. The screen device is extended by the retracting-extending mechanism when it is required to play video information, and is retracted by the retracting-extending mechanism when not used, thereby preventing the screen device from occupying too much space and thus interfering movements of the passengers. Also, the retracting-extending mechanism functions to protect the screen device itself, and prevents the screen device from being accidentally damaged by movements of the passengers.

A screen device in the conventional technology generally employs a turning-over mechanism to extend and retract the screen. The turning-over mechanism includes multiple angular sensors, a spring, a motor, a gear box, a damping gear or an electric brake. The motor and the gear box drive the screen to turn over, the angular sensors are configured to sense a turn-over angle of the screen, the spring is used to stow the screen device when the power is off, the damping gear is used to provide damping in order to prevent the screen from being turned over too fast, and the electric brake is used to stop and hold screen device on a target angle or position. However, the conventional screen turning-over mechanism has too many components and parts, a complex structure, a large installation volume, a high cost and a short service life. For passenger safety, an obstacle detection function is required by those applications, to stop or retract the screen device when the screen device hit the passenger or other obstacle.

SUMMARY

A technical issue to be addressed and a technical task proposed by the present application are to improve the conventional technology to provide a screen turning-over mechanism so as to address the technical issues in the conventional technology that a conventional screen turning-over mechanism has too many components and parts, a complex structure and a large installation volume.

To address the above technical issues, the following technical solutions are adopted by the present application.

A mechanism for turning over a screen includes: a rotating shaft connected to a screen, a motor drivably connected to the rotating shaft, and an elastic mechanism connected to the rotating shaft. The screen is extended and retracted by the rotation of the rotating shaft. The motor is connected to an electromagnetic damping circuit which forms a closed loop when the motor is in a de-energized state. In the case that the motor is energized, the motor drives the rotating shaft to rotate to extend the screen, and the rotating shaft drives the elastic mechanism to deform elastically to store energy; and in the case that the motor is de-energized, the elastic mechanism releases the stored energy to drive the rotating shaft to rotate to retract the screen.

The screen turning-over mechanism according to the present application has fewer components and parts, a simple and compact structure, without too many transmission parts, and also without requiring mechanism such as an electric brake and angular sensors. The motor causes the elastic mechanism to deform elastically to store energy while driving the screen to be extended. When the screen is required to be retracted, the motor is de-energized, and the elastic mechanism releases its stored energy to allow the screen to turn out automatically to be retracted, thus achieving the object that the screen is retracted automatically when the motor is de-energized. In the screen turning-over mechanism according to the present application, a clutch used in the conventional technology is omitted, the process of retracting the screen is started just after the motor is de-energized, and in the process of retracting the screen device, the motor always keeps a drivable connection with the rotating shaft. After the motor is de-energized, the electromagnetic damping loop forms a closed path with the motor, and the elastic mechanism releases its stored energy to drive the rotating shaft to rotate. At the same time, the rotating shaft drives the motor to rotate, and a relative movement is generated between the closed path and a magnetic pole in the motor, such that magnetic flux passing through the closed loop changes, and an induction current may be generated in the closed loop. A magnetic field generated by the induction current creates an electromagnetic resistance to resist the relative movement between the closed path and the motor, thereby achieving the object of slowing down the rotation speed of the rotating shaft, allowing the screen to be retracted smoothly, and preventing the screen from moving to fast to be damaged and ensuring a long-term effective stable operation of the entire screen.

Further, the motor is controlled to be energized or de-energized by a control module, a current feedback circuit connected to the motor is provided in the control module, and the control module performs integral computation to a current flowing through the motor in the process of the screen being extended by the motor and thus control a rotation angle of the motor. In the present application, an operation current of the motor is monitored and is performed with the integral computation, thereby calculating the work performed by the motor and furthermore an angle by which the motor has rotated. Therefore, angular sensors for sensing the rotation angle of the motor are not required to be provided. Further, since the control module performs integral computation to the operation current to calculate the angle by which the motor has rotated, the control module may determine the position where the motor is rotated in a real-time manner, and control the motor to stop moving the screen when the screen is extended in place. Therefore, a brake is not required, the elements are reduced, the manufacturing cost is lowered and an installation volume of the turning-over mechanism is reduced.

Further, the electromagnetic damping loop is a unidirectional conducting circuit with a diode provided in the electromagnetic damping loop. The diode is a unidirectional conducting electronic component, which ensures that a unidirectional current flows in the electromagnetic damping loop only in the process of retracting the screen, and the electromagnetic damping loop is in a cutoff state in the process of extending the screen.

Further, an adjustable resistance is further provided in the electromagnetic damping loop to allow the magnitude of the current for damping generated in the process of retracting the screen to be adjustable, such that the damping force can be adapted to various elastic mechanisms with different elastic forces, thereby improving the flexibility of application and ensuring that the screen can be retracted smoothly.

Further, the elastic mechanism is a scroll spring, and a central portion of the scroll spring is connected to an end of the rotating shaft. The scroll spring is capable of storing kinetic energy effectively and releasing the stored energy when the motor is de-energized, thereby ensuring that the screen can be retracted stably.

Further, the scroll spring is mounted in a housing, and a cover is mounted on the housing to enclose the scroll spring inside the housing, and the rotating shaft passes through the cover to be connected to the scroll spring. Therefore, the scroll spring can be protected effectively and its service life can be prolonged.

Further, the motor is mounted on a base via a motor bracket, and the elastic mechanism is also fixed onto the base.

Further, a force sensor electrically connected to the control module is further provided on the base, and the rotating shaft applies a pressure to the force sensor when the screen is extended in place.

Further, a hinged support is provided on the rotating shaft, a through hole is provided in the hinged support, and the screen is connected to the rotating shaft by a connecting shaft inserted and mounted in the through hole.

Further, the motor is connected to the rotating shaft by a coupler, thereby the connection has a high stability and the transmission is reliable.

Further, the screen is connected to the rotating shaft by gear transmission, or chain transmission or belt transmission Compared with the conventional technology, the present application has following advantages.

The screen turning-over mechanism according to the present application does not require mechanisms such as an electric brake or angular sensors, has fewer components and parts, a simple and compact structure, a high reliability, a small space occupation and a long service life, and retracts the screen automatically by utilizing the elastic energy released by the elastic component in the case that the motor is de-energized and slows down the turning-over speed of the screen by utilizing the electromagnetic damping in the process of retracting, thereby allowing the screen to be retracted smoothly, and preventing the screen from being damaged due to being moved too fast, and ensuring a long-term effective stable operation of the entire screen. Further, the electromagnetic damping is adjusted by the adjustable resistance, thus compensating the error of parameters of the spring and the motor. Further, in the present application, with the algorithm that the rotation angle of the motor can be calculated by using integral computation for the operation current of the motor, no angular sensor for sensing a rotation angle of the motor is required to be provided, the elements are fewer, and the manufacturing cost is further reduced.

DETAILED DESCRIPTION

The technical solutions of embodiments of the present application will be clearly and completely described hereinafter in conjunction with the drawings of the embodiments of the present application. Apparently, the embodiments described are only some examples of the present application, rather than all implementations. Other embodiments obtained by those skilled in the art based on the embodiments of the present application without any creative efforts all fall into the scope of the present application.

A screen turning-over mechanism is provided according to an embodiment of the present application, which has a simple and compact structure, uses fewer components and parts, occupies a small space, can reliably extend and retract a screen without requiring an electric brake and an angular sensor, and its screen is ensured to be turned over smoothly by electromagnetic damping generated by a motor, thereby effectively preventing the screen from being turned over too fast, and improving the reliability in turning over the screen.

Figure 1:
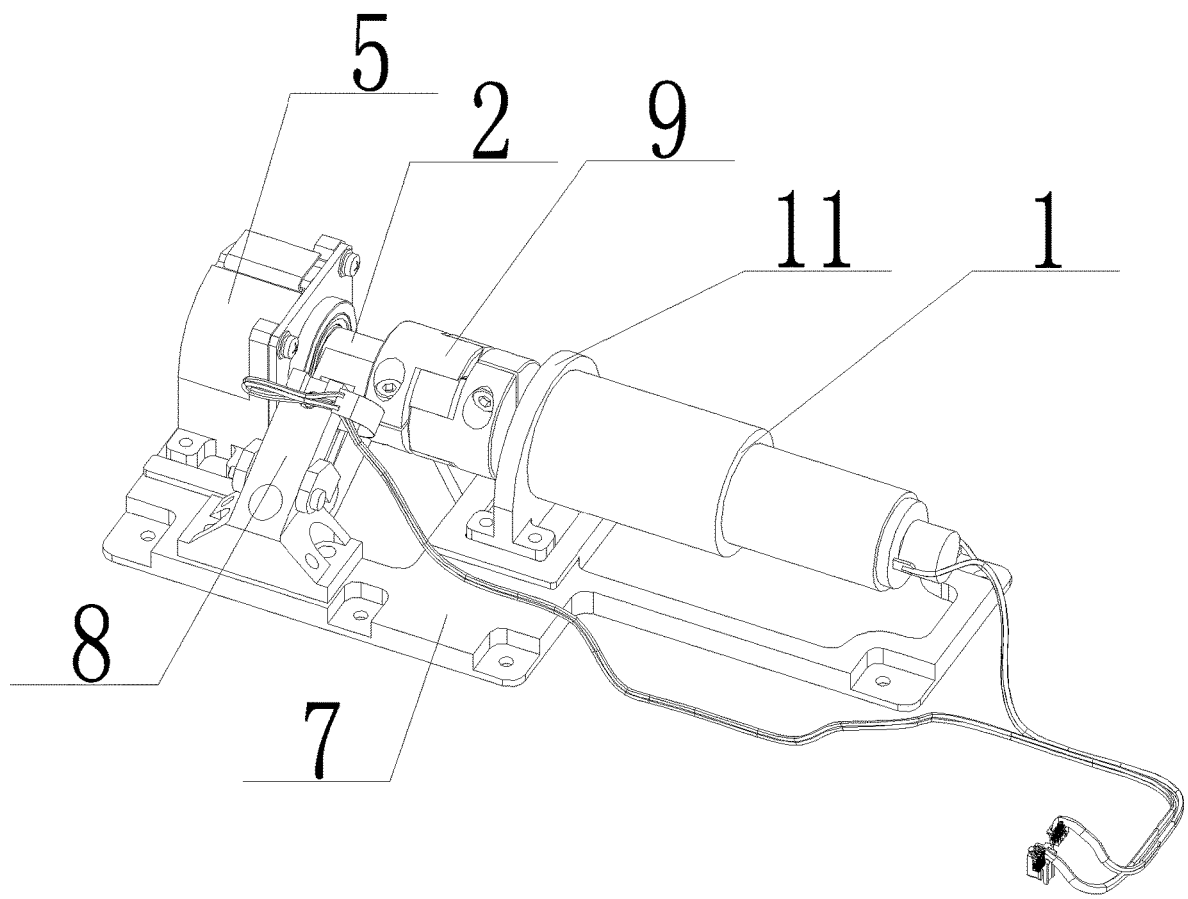
FIG. 1 is a schematic view showing the structure of a screen turning-over mechanism according to the present application.
Figure 2:
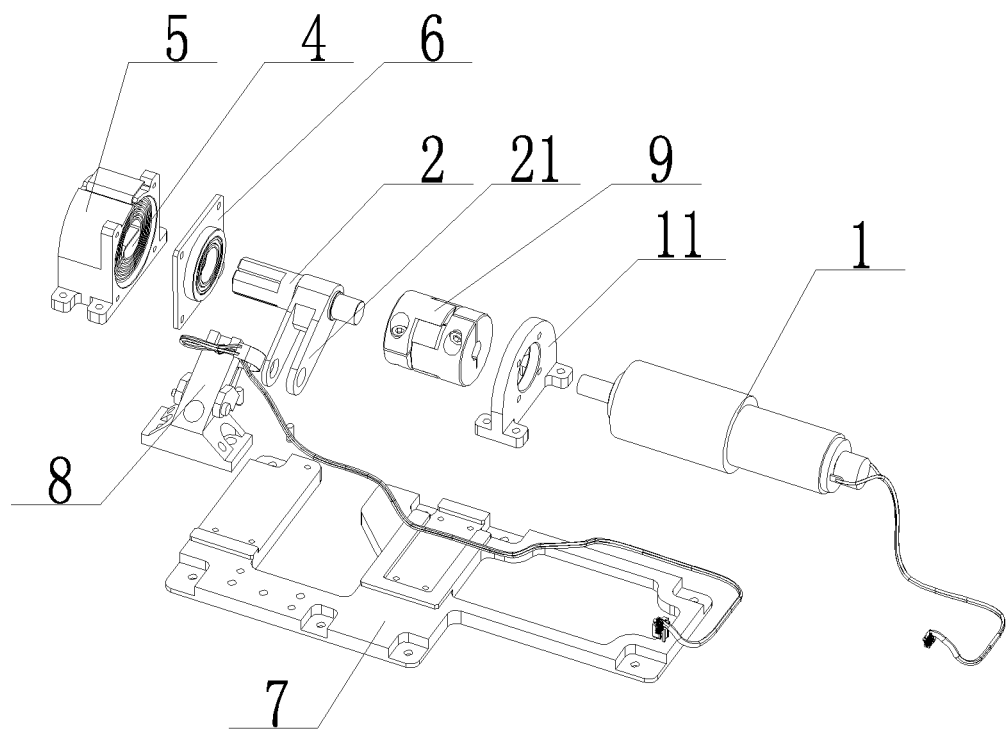
FIG. 2 is a schematic exploded view showing the structure of the screen turning-over mechanism according to the present application.
Figure 3:
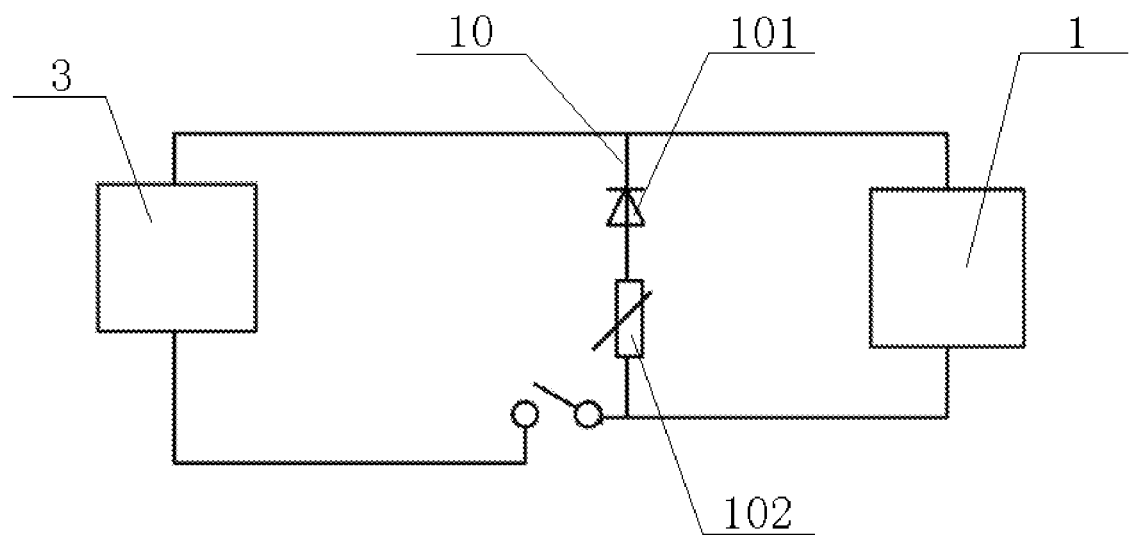
FIG. 3 is schematic structural view showing the connection between a control module and a motor.

As shown in FIGS. 1 to 3, a screen turning-over mechanism includes a motor 1 and a rotating shaft 2. The motor 1 is embodied as a low friction direct current motor. The motor 1 is controlled to operate by a control module 3, which comprises a dynamic adjustable voltage source, current sensing and control circuit, a programmable logic controller, etc. The motor 1 is drivably connected to one end of the rotating shaft 2 by a coupler 9. A screen is connected to the rotating shaft 2. In this embodiment, hinged supports 21 are provided on the rotating shaft 2, two hinged supports 21 in parallel with each other are arranged, with each being provided with a through hole, and the screen is connected to the rotating shaft 2 by a connecting shaft inserted in the through hole. Obviously, the screen may be connected to the rotating shaft 2 by other transmission mechanisms, such as chain transmission, belt transmission or gear transmission, which is not limited to the case herein. The motor 1 is mounted on a base 7 via a motor bracket 11. The rotating shaft 2 has another end connected to an elastic mechanism which is also fixed onto the base 7. The screen is turned over to be retracted and extended by the rotation of the rotating shaft 2. Further, a holder may be provided between the coupler 9 and the rotating shaft 2 to support so as to improve the coaxiality and transmission stability, and extends the service life.

When the motor 1 is controlled by the control module 3 to be energized and operate normally to drive the rotating shaft 2 to rotate so as to extend the screen, the rotating shaft 2 drives the elastic mechanism to deform elastically to store energy. An electromagnetic damping loop is provided in the control module 3 to be connected to the motor 1. When the screen is retracted, the control module 3 cuts off the power supply for normal operation of the motor 1, and the elastic mechanism releases the stored power to drive the rotating shaft 2 to rotate so as to retract the screen. The electromagnetic damping loop and a winding coil of the rotor inside the motor 1 form a closed path. The closed path and a magnetic pole in the motor move relative to each other, and thus generating an induction current for damping. The magnetic pole may generate an Ampere force in response to the induction current, to create a moment of couple in a direction opposite to an original rotation direction of the rotating shaft, thus damping the rotation of the rotor caused by the winding coil of the rotor, namely, slowing down the rotation of the rotating shaft 2, thereby slowing down the rotation speed of the rotating shaft 2, ensuring that the screen can be turned over smoothly, preventing the screen from being damaged, improving the retracting and extending effect and prolonging the service life. The number of times of retracting and extending can be increased by at least 5 times. Also, a current feedback circuit connected to the motor 1 is further provided in the control module 3. The control module 3 is configured to integral computation to the current flowing through the motor 1 when the motor 1 operates to extend the screen, and thereby calculating an angle by which the motor 1 is rotated under the control. Therefore, angular sensors for sensing a turn-over angle of the screen are not required, and components used are reduced, such that the structure of the screen turning-over mechanism is more compact, and less volume of space is occupied.

In order to ensure that the induction current generating the damping circulates in the electromagnetic damping loop only when the screen is being retracted, the electromagnetic damping loop is configured to be a unidirectional conducting circuit with a diode provided therein. Also, an adjustable resistance is provided in the electromagnetic damping loop, thus controlling the magnitude of the generated induction current, and allowing the damping force to be adjustable flexibly, so as to be adapted to elastic mechanisms with various elastic forces.

The elastic mechanism can be embodied as various structures, such as a torsion spring and a leaf spring. In this embodiment, the elastic mechanism is embodied as a scroll spring 4. A central portion of the scroll spring 4 is connected to an end of the rotating shaft 2. The scroll spring 4 is mounted in a housing 5, and a cover 6 is mounted on the housing 5 to enclose the scroll spring inside the housing 5. The rotating shaft 2 passes through the cover 6 to be connected to the scroll spring 4. Therefore, the scroll spring 4 is protected effectively, and is ensured to work effectively and stably for a long-term and the service life of the scroll spring 4 is extended, and the scroll spring 4 can store energy effectively. The scroll spring 4 is contracted to store energy when the screen is being extended, and releases the stored energy slowly to drive the screen to be retracted when the screen is being retracted.

Also, a force sensor 8 electrically connected to the control module 3 may be provided on the base 7. The rotating shaft 2 applies a pressure to the force sensor 8 when the screen is extended in place, and the force sensor may serve as a detection element for detecting whether the screen is turned on to the position. Further, when the screen is in a state of being extended in place, the force sensor is subjected to a certain pressure, a threshold value is set in the control module, and when the pressure subjected by the force sensor exceeds the range of the threshold value, the motor is de-energized, and the screen is retracted automatically. When passenger or other obstacles hit a front side of the screen device, the force may also be applied on the force sensor. So the force sensor can monitor the force continuously. Thus, the screen can be retracted automatically in the case that the force subjected by the force sensor changes due to touching of human, thereby preventing the components such as the screen and the motor from being damaged due to being artificially moved and ensuring a service life of the device.

The above embodiments are preferable embodiments of the present application. It should be noted that, the preferable embodiments described above should not be regarded as a limit to the present application. The scope of the present application is defined by claims. For those skilled in the art, a few of modifications and improvements may be made to the present application without departing from the principle of the present application, and these modifications and improvements are also deemed to fall into the scope of the present application.

The invention claimed is:
1. A screen turning-over mechanism, comprising:
a rotating shaft connected to a screen;
a motor drivably and coaxially connected to the rotating shaft; and
a scroll spring coaxially connected to the rotating shaft, and a central portion of the scroll spring is connected to an end of the rotating shaft;
wherein
the motor is connected to an electromagnetic damping loop which forms a closed path with the motor only when the motor is in a de-energized state;
the motor is mounted on a base via a motor bracket, and the scroll spring is also fixed onto the base; and a force sensor in electrically connected to the control module is further provided on the base, and the rotating shaft applies a pressure to the force sensor when the screen is extended in place,
the motor is controlled by a control module to be energized or de-energized, a current feedback circuit connected to the motor is provided in the control module, and the control module performs integral computation to a current flowing through the motor in the process of the screen being extended by the motor and thus controls a rotation angle of the motor,
in the case that the motor is energized, the motor drives the rotating shaft to rotate to extend the screen, and the rotating shaft drives the scroll spring to deform elastically to store energy; and
in the case that the motor is de-energized, the scroll spring releases the stored energy to drive the rotating shaft to rotate to retract the screen.

2. The screen turning-over mechanism according to claim 1, wherein the electromagnetic damping loop is a unidirectional conducting circuit with a diode provided in the electromagnetic damping loop.

3. The screen turning-over mechanism according to claim 2, wherein an adjustable resistance is further provided in the electromagnetic damping loop.

4. The screen turning-over mechanism according to claim 1, wherein the scroll spring is mounted in a housing, a cover is mounted on the housing to enclose the scroll spring inside the housing, and the rotating shaft passes through the cover to be connected to the scroll spring.

5. The screen turning-over mechanism according to claim 1, wherein a hinged support is provided on the rotating shaft, a through hole is provided in the hinged support, and the screen is connected to the rotating shaft by a connecting shaft which is inserted and mounted in the through hole.

6. The screen turning-over mechanism according to claim 1, wherein the motor is connected to the rotating shaft by a coupler.

7. The screen turning-over mechanism according to claim 1, wherein the screen is connected to the rotating shaft by gear transmission, or chain transmission or belt transmission.

* * * * *